United States Patent
Hsu et al.

(10) Patent No.: US 10,272,379 B2
(45) Date of Patent: Apr. 30, 2019

(54) DUST REMOVAL DEVICE, DUST COLLECTOR, AND DUST COLLECTOR CLEANING METHOD

(71) Applicant: METAL INDUSTRIES RESEARCH & DEVELOPMENT CENTRE, Kaohsiung (TW)

(72) Inventors: Tai-Hsin Hsu, Kaohsiung (TW); Chih-Hsiung Chiou, Kaohsiung (TW)

(73) Assignee: METAL INDUSTRIES RESEARCH & DEVELOPMENT CENTRE, Kaohsiung (TW)

( * ) Notice: Subject to any disclaimer, the term of this patent is extended or adjusted under 35 U.S.C. 154(b) by 198 days.

(21) Appl. No.: 15/348,261

(22) Filed: Nov. 10, 2016

(65) Prior Publication Data

US 2018/0050295 A1 Feb. 22, 2018

(30) Foreign Application Priority Data

Aug. 19, 2016 (TW) .............................. 105126646 A

(51) Int. Cl.
*B01D 46/00* (2006.01)
*B01D 46/24* (2006.01)
*B01D 46/52* (2006.01)

(52) U.S. Cl.
CPC ..... *B01D 46/0075* (2013.01); *B01D 46/0023* (2013.01); *B01D 46/0024* (2013.01);
(Continued)

(58) Field of Classification Search
CPC .............. B01D 46/521; B01D 46/2411; B01D 46/0021; B01D 46/24; B01D 46/2403;
(Continued)

(56) References Cited

U.S. PATENT DOCUMENTS

| 5,478,372 A | 12/1995 | Stark | |
|---|---|---|---|
| 7,670,528 B2* | 3/2010 | Patel | B01D 29/111 264/287 |
| 2014/0260138 A1* | 9/2014 | Edwards | B01D 46/0001 55/483 |

FOREIGN PATENT DOCUMENTS

| CN | 204294018 U | 4/2015 |
|---|---|---|
| TW | M241124 | 8/2004 |

(Continued)

OTHER PUBLICATIONS

Office Action dated Sep. 22, 2017, issued in counterpart Taiwanese Application No. 105126646. (6 pages).

*Primary Examiner* — Robert Clemente
(74) *Attorney, Agent, or Firm* — Juan Carlos A. Marquez; Marquez IP Law Office, PLLC

(57) ABSTRACT

A dust removal device includes: an upper cover, a base, a support body, and a dust collector. The support body couples with the upper cover and the base. The dust collector includes: a first connecting member, a second connecting member, and a dust collecting body. The dust collecting body is coupled with the first connecting member and the second connecting member and has a folded structure. When an external force enables a shape of the first dust collecting body to be changed, a distance between the first connecting member and the second connecting member is also changed. In a cleaning mode, the dust collecting body is stretched and compressed in a reciprocating manner by using a structure of the dust collecting body.

15 Claims, 12 Drawing Sheets

(52) U.S. Cl.
CPC ..... *B01D 46/0065* (2013.01); *B01D 46/0076* (2013.01); *B01D 46/0082* (2013.01); *B01D 46/2411* (2013.01); *B01D 46/521* (2013.01)

(58) Field of Classification Search
CPC ............ B01D 46/0072; B01D 46/0075; B01D 46/0065; B01D 46/0076; B01D 46/0023; B01D 46/0024; B01D 46/0082
See application file for complete search history.

(56) References Cited

FOREIGN PATENT DOCUMENTS

| | | |
|---|---|---|
| TW | M282737 | 12/2005 |
| TW | M333949 | 6/2008 |
| TW | M495893 | 2/2015 |
| TW | 201622801 A | 7/2016 |

\* cited by examiner

DUST REMOVAL DEVICE, DUST COLLECTOR, AND DUST COLLECTOR CLEANING METHOD

CROSS-REFERENCE TO RELATED APPLICATION

This application claims the benefit of Taiwan Patent Application No. 105126646, filed on Aug. 19, 2016, which is hereby incorporated by reference for all purposes as if fully set forth herein.

BACKGROUND

Technical Field

The present disclosure relates to a dust removal device, a dust collector, and a dust collector cleaning method, for extracting dust in air.

Related Art

Generally, in wood factories or other workplaces, due to operations such as cutting and grinding, plants of the wood factories or other workplaces are filled with dust, and the dust may cause dust explosions, fire, or other industrial disasters in addition to affecting health of workers. Therefore, the factories need to install large dust removal devices, so as to continuously filter and remove dust from air in the factories.

Currently, to increase contact areas between dust and filter screens, both of planar and cylindrical filter screens are designed to form continuous pleats, as disclosed in earlier applications below: Patent No.: U.S. Pat. No. 5,478,372 discloses the high temperature, chemical resistant laminate for filtration systems, Patent No.: TW M333949 discloses an automatic sweeping device, Patent No.: TW M282737 discloses a sealing dust collector, Patent No.: TW M241124 discloses a sweeping structure of dust collecting device, Patent No.: TW M495893 discloses a dust collector, and the like. However, currently, pleats of a conventional filter screen A are parallel to an axial direction (as shown in FIG. 1). Although this design can increase a contact area between dust and a filter screen, the spatial variation function of the pleats is not used.

SUMMARY

An objective of the present disclosure is to provide a dust removal device, a dust collector, and a dust collector cleaning method, so as to remove dust in air.

To achieve the above objective, the present disclosure provides a dust removal device includes: an upper cover, a base, a support body, and a dust collector. The support body couples with the upper cover and the base. The dust collector is located between the upper cover and the base, and used to remove dust in air. The dust collector includes: a first connecting member, a second connecting member, and a dust collecting body. The dust collecting body is coupled with the first connecting member and the second connecting member and has a folded structure. When an external force enables a shape of the first dust collecting body to be changed, a distance between the first connecting member and the second connecting member is also changed. As compared with the prior art that pleats of a conventional cylindrical filter screen are parallel to an axial direction, the dust collecting body of the present disclosure is stretched and compressed in a reciprocating manner by using a structure of the dust collecting body, so as to change an adhesion relationship between the dust collecting body and dust, thereby shaking off the adhered dust. Therefore, the dust collecting body has functions to synchronously clean a whole area of the dust collecting body. Moreover, by means of design of a combined structure, a storage space is reduced.

To make the foregoing and other objectives, features, and advantages of the present disclosure more comprehensible, description is made in detail below with reference to the accompanying drawings.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Figure 1:
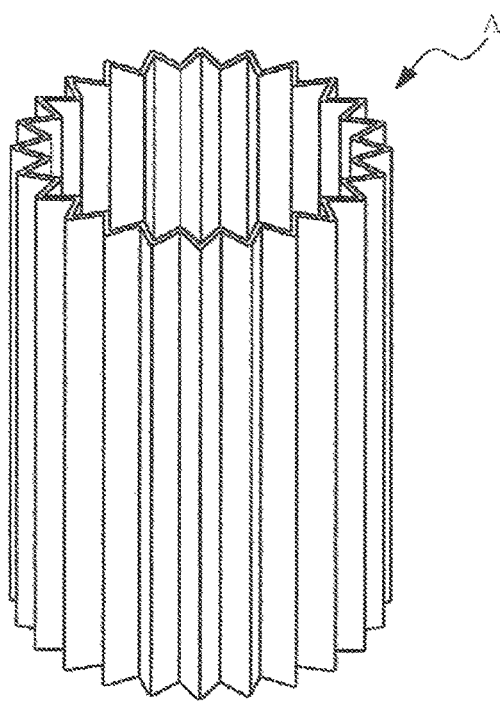
FIG. 1 is a schematic view of a filter screen in the prior art.
Figure 2:
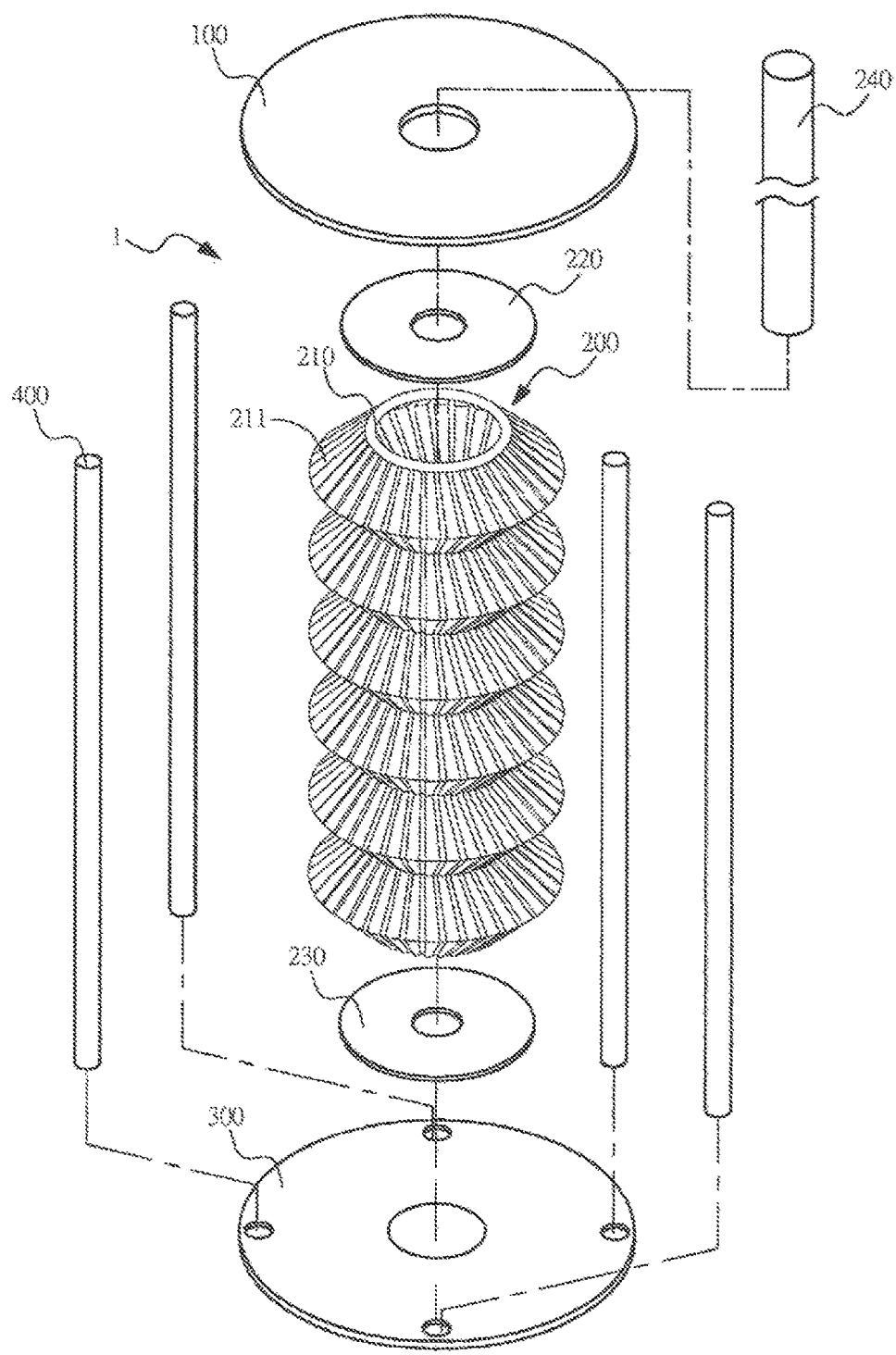
FIG. 2 is an exploded schematic view of a dust removal device according to an embodiment of the present disclosure.
Figure 3A:
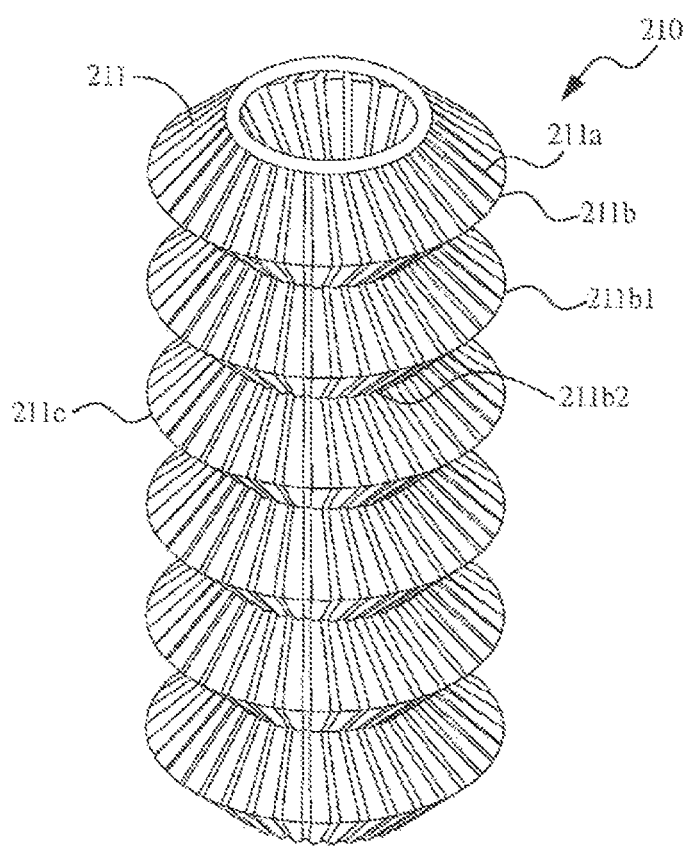
FIG. 3a is a schematic view of a first dust collecting body according to an embodiment of the present disclosure.

FIG. 2 is an exploded schematic view of a dust removal device 1 according to a first embodiment of the present disclosure. FIG. 3a is a schematic view of a first dust collecting body 210 according to an embodiment of the present disclosure. Referring to FIG. 2 and FIG. 3a, the dust removal device 1 includes an upper cover 100, a base 300, a support body 400, and a dust collector 200. The support body 400 couples with (e.g., physically connects) the upper cover 100 and the base 300. The dust collector 200 is located between the upper cover 100 and the base 300 for extracting dust in air. The dust collector 200 includes: a first connecting member 220, a second connecting member 230, and the first dust collecting body 210. The first dust collecting body 210 is coupled with (e.g., securely connected between) the first connecting member 220 and the second connecting member 230 and has a folded structure. When an external force enables a shape of the first dust collecting body 210 to be changed, a distance between the first connecting member 220 and the second connecting member 230 is also changed.

The first connecting member 220 or the second connecting member 230 is preferably of a plate shape, and the plate shape makes it convenient for compressing and stretching deformations of the first dust collecting body 210.

Figure 3B:
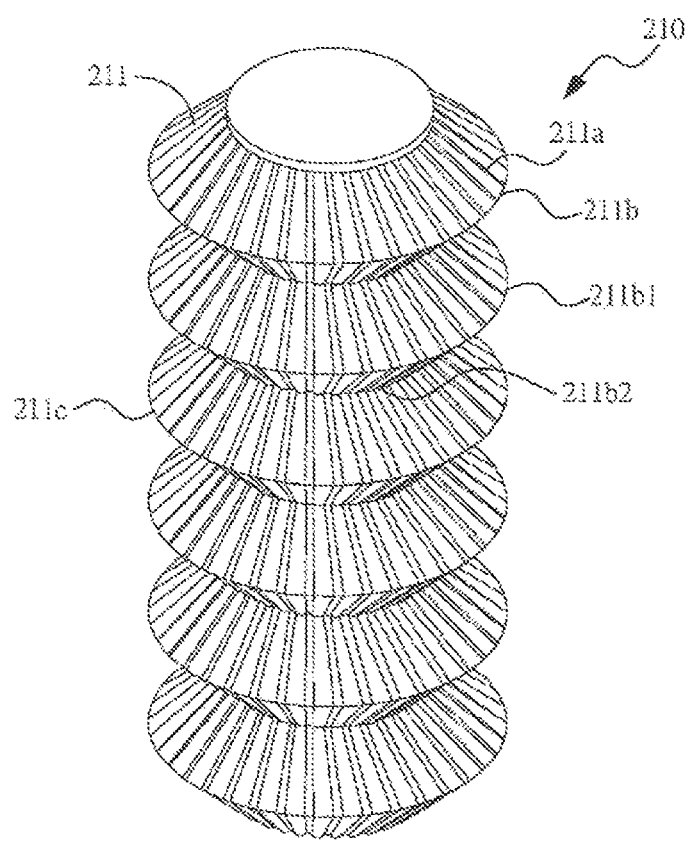
FIG. 3b is a schematic view of a first dust collecting body according to another embodiment of the present disclosure.

FIG. 3b is a schematic view of a first dust collecting body according to another embodiment of the present disclosure. Referring to FIG. 3a and FIG. 3b, the first dust collecting body 210 can be designed to be provided with at least one opening at two ends thereof, so as to be fitted with overall design of the dust collector 200.

Figure 4A:
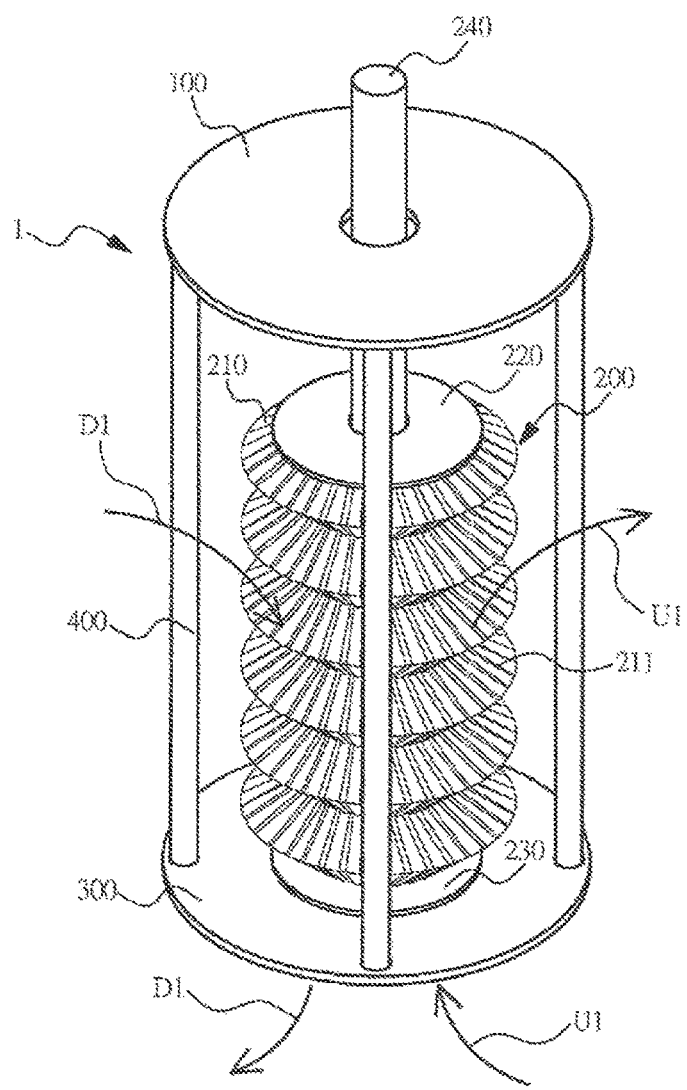
FIG. 4a is a schematic view of a dust removal device according to an embodiment of the present disclosure.

FIG. 4a is a schematic view of a dust removal device 1 according to an embodiment of the present disclosure. Referring to FIG. 4a, in a working mode, the dust removal device 1 can enable external airflow U1 to flow into the first dust collecting body 210 from the base 300 and the second connecting member 230, and subsequently flow outwards from a side wall 211 of the first dust collecting body 210, so as to enable dust or a particular gas to adhere to an inner side of the first dust collecting body 210; or, preferably, can enable external airflow D1 to flow into the first dust collecting body 210 from a side wall 211 of the first dust collecting body 210, and subsequently flow outwards from the second connecting member 230 and the base 300, so as to enable dust or a particular gas to adhere to an outer side of the first dust collecting body 210.

The dust collector 200 further includes a transmission unit 240 coupled with (e.g., physically connected to) one of the first connecting member 220 and the second connecting member 230 and used to provide the external force. Therefore, when the transmission unit 240 drives the first connecting member 220 or the second connecting member 230 so as to change a distance between the first connecting member 220 and the second connecting member 230, the external force from the transmission unit 240 also enables a shape of the first dust collecting body 210 to be changed. Power of the transmission unit 240 is selected from one of human power, a motor, an ultrasonic source.

The dust collector 200 can quickly change the distance between the first connecting member 220 and the second connecting member 230 by using an operation of the transmission unit 240, so as to vibrate the first dust collecting body 210, thereby generating an inertial force. The inertial force enables the dust adhered to the first dust collecting body 210 to fall off, so as to achieve an objective of cleaning the first dust collecting body 210.

Referring to FIG. 3a and FIG. 3b again, the folded structure of the first dust collecting body 210 includes at least one non-traverse pleat (e.g., a longitudinal pleat 211a) cooperating with the traverse pleat 221b, which is used to increase a filtration area of the first dust collecting body 210 and to absorb or release, by working together with a change of relationships between the traverse pleat 221b and the first connecting member 220 and between the traverse pleat 221b and the second connecting member 230, a stress change of a structural change of the first dust collecting body 210, so as to facilitate the consistency of a reciprocating space change of the first dust collecting body 210; and at least one traverse pleat 211b, wherein a tangential direction of the traverse pleat 211b is vertical to a direction from the first connecting member 220 to the second connecting member 230, and the tangential direction does not change with a distance relationship between the first connecting member 220 and the second connecting member 230. The traverse pleat 211b can be coupled to (e.g., embedded with or adhered to) a support frame 211c (e.g., a metallic support frame), so as to retain a shape of the traverse pleat 211b of the first dust collecting body 210. For example, the traverse pleats 211b include a large-sized traverse pleat 211b1 and a small-sized horizontal pleat 211b2, and the support frame 211c can be embedded in or can adhere to the large-sized traverse pleat 211b1 or the small-sized traverse pleat 211b2, so as to retain a shape of the large-sized traverse pleat 211b1 or the small-sized traverse pleat 211b2. For example, when the support frame 211c is coupled to the large-sized traverse pleat 211b1, in a structural change process, the large-sized traverse pleat 211b1 retains the same shape and the same size, but the small-sized traverse pleat 211b2 retains the same shape but changes a radius in the structural change process. Conversely, when the support frame 211c is coupled to the small-sized traverse pleat 211b2, the small-sized traverse pleat 211b2 retains the same shape and the same size, but the large-sized traverse pleat 211b1 changes a radius. Therefore, features of a support frame coupled to the small-sized traverse pleat 211b2 are different from features of a support frame coupled to the large-sized traverse pleat 211b1. The first dust collecting body 210 is a hollow structure. In a cleaning mode, a structure of the first dust collecting body 210 can be stretched and compressed in a reciprocating manner by using the external force, so as to change an adhesion relationship between a filter material of the first dust collecting body 210 and dust, thereby shaking off the adhered dust. Therefore, the first dust collecting body 210 has functions to synchronously clean a whole area of the first dust collecting body 210. Moreover, by means of design of a combined structure, a storage space is reduced.

The first dust collecting body 210 can be selected from the group consisting of metal mesh, non-woven fabric, filter fabric, polytetrafluoroethylene (PTFE), polypropylene fiber, polyester fiber, glass fiber, carbon fiber, activated carbon polyester fiber, and a combination thereof. A coating of the first dust collecting body 210 can be selected from ceramic powder, activated carbon, photocatalyst, aerogel, and a combination thereof.

Figure 4B:
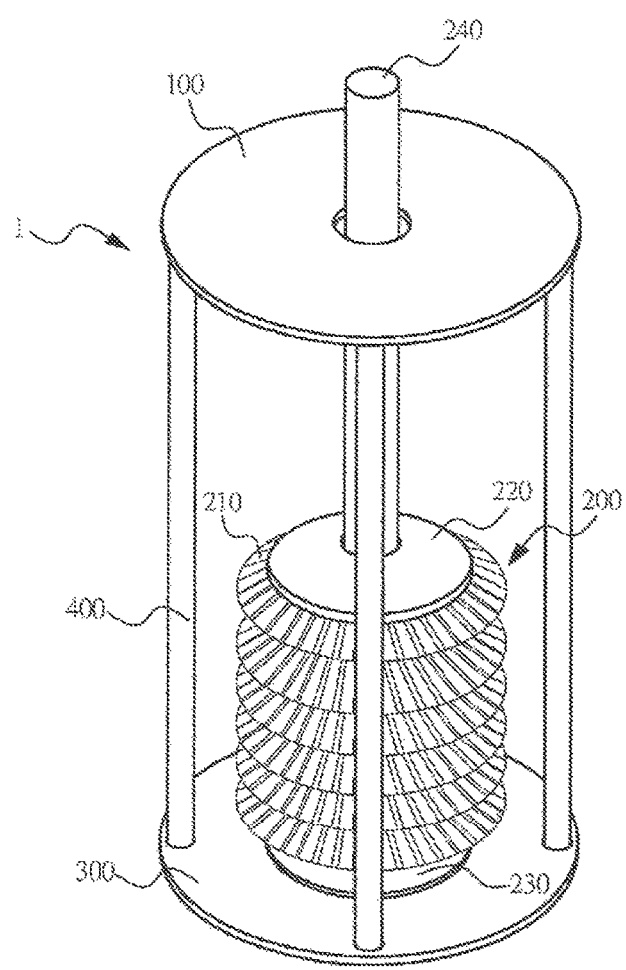
FIG. 4b is a schematic view of a dust removal device according to another embodiment of the present disclosure.

FIG. 4b is a schematic view of a dust removal device 1 according to another embodiment of the present disclosure. Referring to FIG. 4a and FIG. 4b again, in a cleaning mode, the dust collector 200 uses the folded structure to change the shape of the first dust collecting body 210, so as to clean dust which is adhered to the first dust collecting body 210; the transmission unit 240 is used to vibrate the first dust collecting body 210, so as to generate an inertial force, and the inertial force cleans the dust adhered to the first dust collecting body 210; and the dust collector 200 uses a brush, an ultrasound source, a beating mechanism, pulse air stream, or water spray to assist to clean the dust which is adhered to the first dust collecting body 210.

Figure 5:
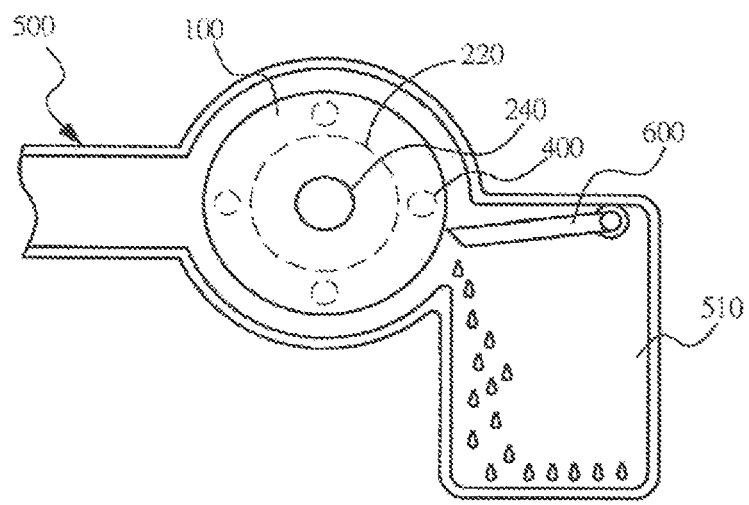
FIG. 5 is a schematic cross-sectional view of a construction of applying the dust removal device to a dust collecting chamber according to an embodiment of the present disclosure.

FIG. 5 is a schematic cross-sectional view of a construction of applying the dust removal device 1 to a dust collecting chamber 500 according to an embodiment of the present disclosure. Referring to FIG. 4a and FIG. 5, the dust removal device 1 is applied to the dust collecting chamber 500. The dust collecting cabin 500 includes a dust collecting compartment 510 and a sweeping element 600, and when the dust removal device 1 enters the cleaning mode, the sweeping element 600 sweeps the dust in the first dust collecting body 210 to the dust collecting compartment 510, so as to collect the dust.

Figure 6:
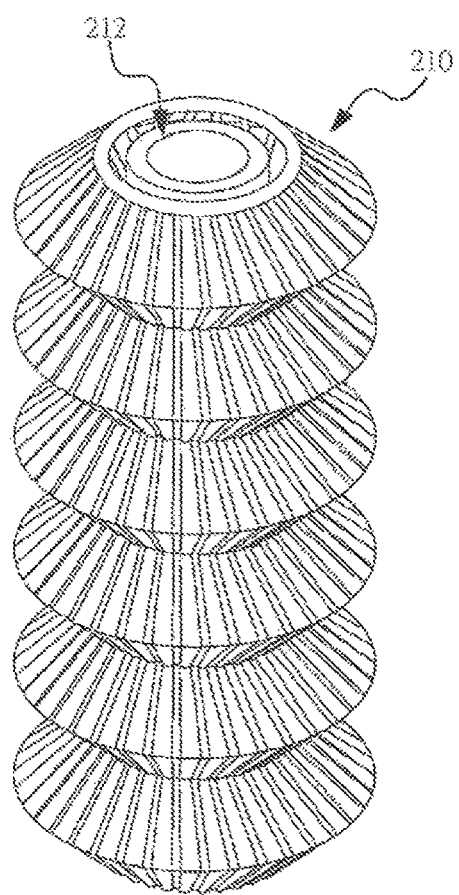
FIG. 6 is a schematic view of application of another dust collecting body according to an embodiment of the present disclosure.
Figure 7:
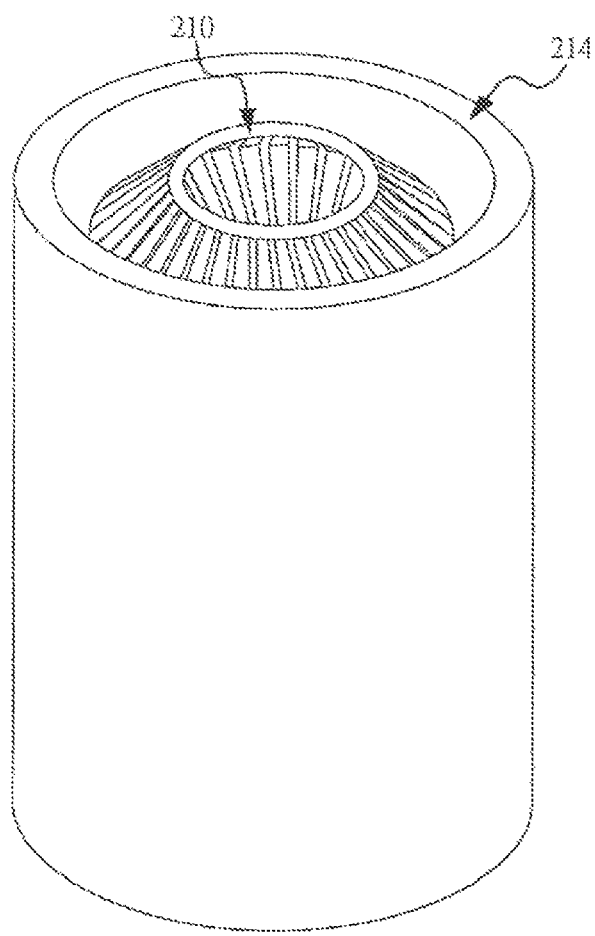
FIG. 7 is a schematic view of application of still another dust collecting body according to an embodiment of the present disclosure.
Figure 8:
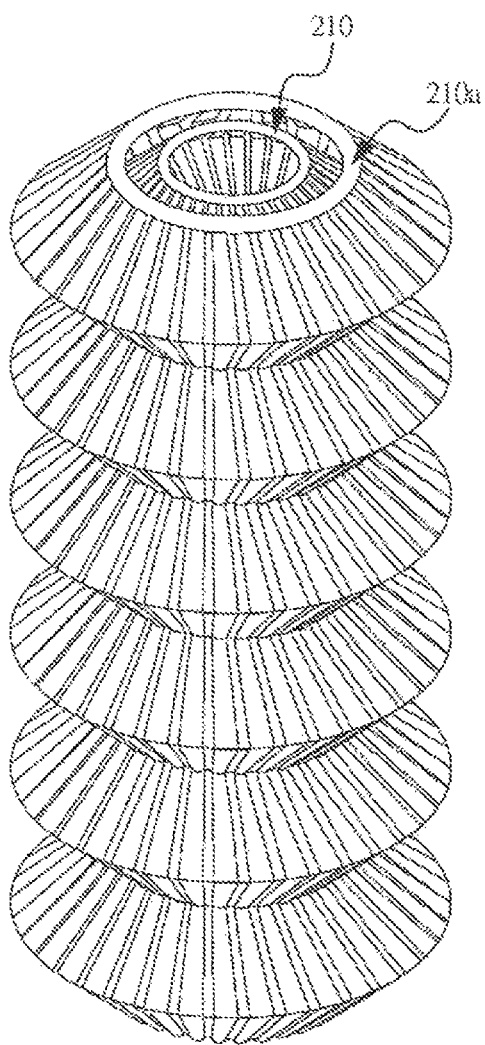
FIG. 8 is a schematic view of application of yet another dust collecting body according to an embodiment of the present disclosure.

FIG. 6 is a schematic view of application of another dust collecting body 212 according to an embodiment of the present disclosure, FIG. 7 is a schematic view of application of still another dust collecting body 214 according to an embodiment of the present disclosure, and FIG. 8 is a schematic view of application of yet another dust collecting body 210a according to an embodiment of the present disclosure. Referring to FIG. 6, FIG. 7, and FIG. 8, the first dust collecting body 210 can be coupled with (e.g., combined with or nested with) a second dust collecting body. For example, the second dust collecting body can be another dust collecting body 210a (i.e., the dust collecting body of the present disclosure), still another dust collecting body 212 (i.e., a conventional filter screen), or yet another dust collecting body 214 (i.e., a conventional filter screen). To process air flow directions (e.g., flowing from the outside to the inside or flowing from the inside to the outside) of different environments (high temperature or acidic/alkaline), the first dust collecting body 210 and the second dust collecting body can be made of different materials and can be coupled with (e.g., combined with or nested with) each other in various manners.

Figure 9:
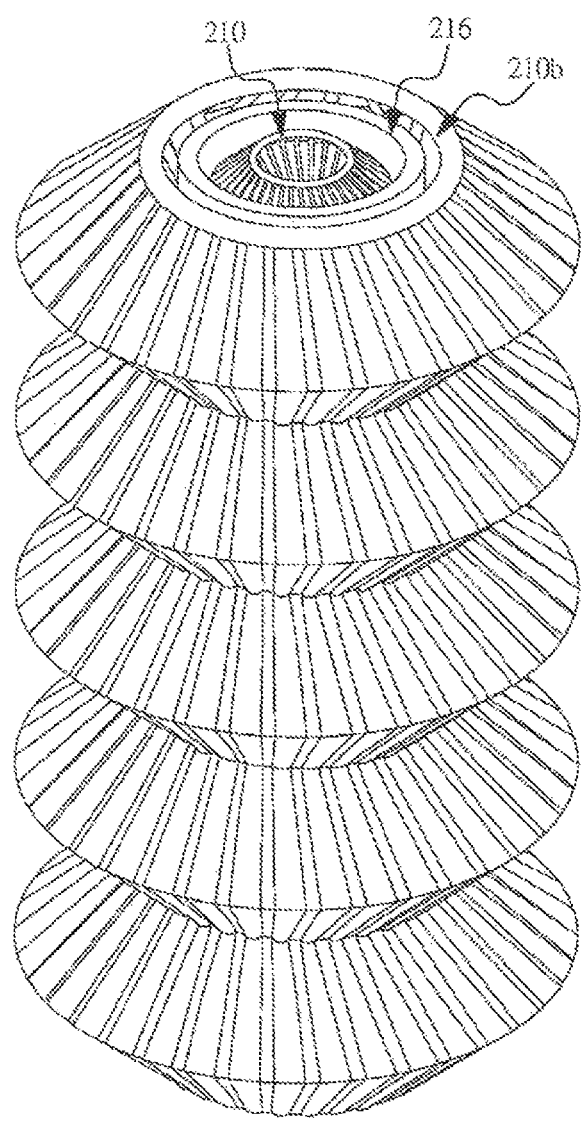
FIG. 9 is a schematic view of application of two dust collecting bodies according to an embodiment of the present disclosure.
Figure 10:
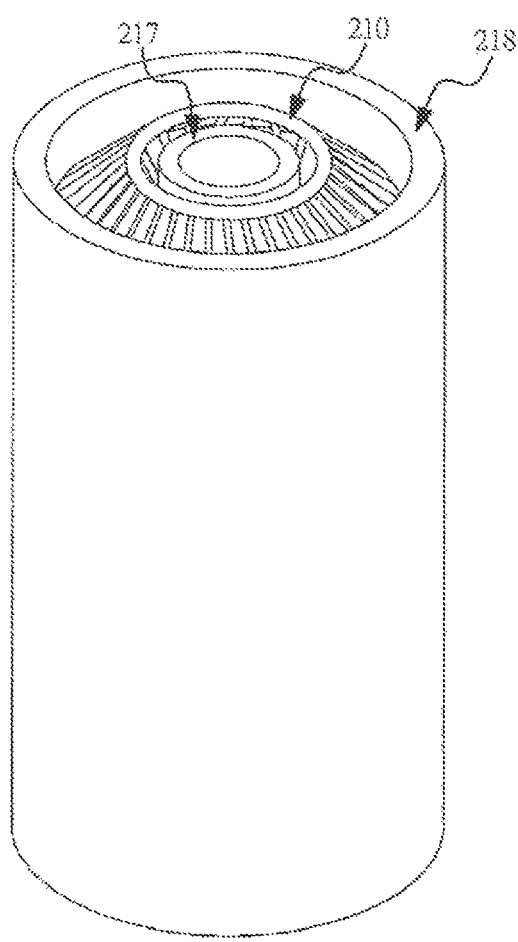
FIG. 10 is a schematic view of application of two other dust collecting bodies according to an embodiment of the present disclosure.

FIG. 9 is a schematic view of application of two dust collecting bodies according to an embodiment of the present disclosure, and FIG. 10 is a schematic view of application of two other dust collecting bodies according to an embodiment of the present disclosure. Referring to FIG. 9 and FIG. 10, the first dust collecting body 210 can be coupled with (e.g., combined with or nested with) the second dust collecting body and a third dust collecting body. For example, the second dust collecting body can be another dust collecting body 210b (the dust collecting body of the present disclosure), and the third dust collecting body can be still another dust collecting body 216 (a conventional filter screen), or yet another dust collecting body 217 (a conventional filter screen), or still yet another dust collecting body 218 (a conventional filter screen). To process air flow directions (e.g., flowing from the outside to the inside or flowing from the inside to the outside) of different environments (high temperature or acidic/alkaline), the first dust collecting body 210, the second dust collecting body, and the third dust collecting body can be made of different materials and can be coupled with (e.g., combined with or nested with) each other in various manners. However, a quantity of coupled layers of the dust collecting bodies is not limited to three, and the quantity of coupled layers can be increased according to actual requirements.

The dust collector of the dust removal device of the present disclosure is used to extract dust in air. The dust collecting body of the dust collector of the present disclosure is coupled with (e.g., securely connected between) the first connecting member and the second connecting member and has a folded structure. When an external force enables a shape of the first dust collecting body to be changed, a distance between the first connecting member and the second connecting member is also changed. In the cleaning mode, with the dust collector cleaning method of the present disclosure, when the external force is used to change a shape of the dust collecting body, dust which is adhered to the dust colleting body can be removed. In addition, as compared with the prior art that pleats of a conventional dust colleting body are parallel to an axial direction, the dust collecting body of the present disclosure is stretched and compressed in a reciprocating manner by using a structure of the dust collecting body, so as to change an adhesion relationship between the dust collecting body and dust, thereby shaking off the adhered dust. Therefore, the dust collecting body has functions to synchronously clean a whole area of the dust collecting body. Moreover, by means of design of a combined structure, a storage space is reduced.

The foregoing description merely describes implementation manners or embodiments of the present disclosure for presenting technical means adopted for resolving a problem, and is not intended to limit the implementation scope of the present disclosure. That is, equivalent variation and modifications consistent with the content of the claims of the present disclosure or made according to the claims of the present disclosure fall within the scope of the claims of the present disclosure.

What is claimed is:

1. A dust collector, comprising:
   a first connecting member;
   a second connecting member;
   a first dust collecting body, coupled with the first connecting member and the second connecting member, and having a folded structure, wherein when an external force enables a shape of the first dust collecting body to be changed, a distance between the first connecting member and the second connecting member is also changed; and
   a transmission unit coupled with one of the first connecting member and the second connecting member, and used to provide the external force, wherein when the transmission unit drives one of the first connecting member and the second connecting member so as to change the distance between the first connecting member and the second connecting member, the external force from the transmission unit also enables the shape of the first dust collecting body to be changed.

2. The dust collector of claim 1, wherein at least one of the first connecting member and the second connecting member is a plate shape.

3. The dust collector of claim 1, wherein the first dust collecting body is provided with at least one opening at two ends thereof.

4. The dust collector of claim 1, wherein the folded structure comprises at least one traverse pleat vertical to a direction from the first connecting member to the second connecting member.

5. The dust collector of claim 4, wherein the folded structure further comprises at least one non-traverse pleat used to absorb or release a stress change of a structural change of the first dust collecting body.

6. The dust collector of claim 4, wherein the traverse pleat is coupled to a support frame, so as to retain a shape of the traverse pleat of the first dust collecting body.

7. The dust collector of claim 1, wherein the first dust collecting body is a hollow structure.

8. The dust collector of claim 1, wherein the first dust collecting body is selected from the group consisting of metal mesh, non-woven fabric, filter cloth, polytetrafluoroethylene, polypropylene fiber, polyester fiber, glass fiber, carbon fiber, activated carbon polyester fiber, and a combination thereof.

9. The dust collector of claim 1, further comprising: a second dust collecting body coupled with the first dust collecting body.

10. The dust collector of claim 9, further comprising: a third dust collecting body coupled with the first dust collecting body and the second dust collecting body.

11. A dust collector cleaning method, comprising the following steps of:
   providing a dust collector, wherein the dust collector comprises:
   a first connecting member;
   a second connecting member; and a first dust collecting body, coupled with the first connecting member and the second connecting member, and having a folded structure, wherein when an external force enables a shape of the first dust collecting body to be changed, a distance between the first connecting member and the second connecting member is also changed; and entering a cleaning mode, wherein the folded structure is used to change the shape of the first dust collecting body, so as to clean dust adhered to the first dust collecting body.

12. The dust collector cleaning method of claim 11, wherein the first dust collecting body is vibrated by changing the distance between the first connecting member and the second connecting member.

13. The dust collector cleaning method of claim 11, wherein the first dust collecting body is vibrated by using a transmission unit.

14. The dust collector cleaning method of claim 11, wherein at least one of a brush, an ultrasound source, a beating mechanism, pulse air stream, and water spray is used to assist to clean the dust adhered to the first dust collecting body.

15. A dust removal device, comprising:
an upper cover;
a base;
a support body, wherein the support body couples with the upper cover and the base; and
a dust collector, located between the upper cover and the base, and used to extract dust in air, wherein the dust collector comprises:
a first connecting member;
a second connecting member; and
a first dust collecting body, coupled with the first connecting member and the second connecting member, and having a folded structure, wherein when an external force enables a shape of the first dust collecting body to be changed, a distance between the first connecting member and the second connecting member is also changed;
wherein the dust removal device is applied to a dust collecting chamber, the dust collecting chamber comprises a dust collecting compartment and a sweeping element, and when the dust removal device enters the cleaning mode, the sweeping element sweeps the dust in the first dust collecting body to the dust collecting compartment, so as to collect the dust.

* * * * *